(12) United States Patent
Zhang et al.

(10) Patent No.: US 11,957,269 B2
(45) Date of Patent: *Apr. 16, 2024

(54) COFFEE MACHINE FOR WIRELESSLY DRIVING COFFEE FILTER CUP TO ROTATE

(71) Applicant: Shenzhen Buydeem Technology Co., Shenzhen (CN)

(72) Inventors: George Mohan Zhang, Shenzhen (CN); Huajin Chen, Shenzhen (CN)

(73) Assignee: SHENZHEN BUYDEEM TECHNOLOGY CO., Shenzhen (CN)

( * ) Notice: Subject to any disclaimer, the term of this patent is extended or adjusted under 35 U.S.C. 154(b) by 193 days.

This patent is subject to a terminal disclaimer.

(21) Appl. No.: 17/507,831

(22) Filed: Oct. 22, 2021

(65) Prior Publication Data
US 2022/0265083 A1   Aug. 25, 2022

(30) Foreign Application Priority Data
Feb. 25, 2021  (CN) .......................... 202110212408.5

(51) Int. Cl.
  A47J 31/44  (2006.01)
(52) U.S. Cl.
  CPC .......... *A47J 31/446* (2013.01); *A47J 31/4425* (2013.01)
(58) Field of Classification Search
  CPC ............ A47J 31/3671; A47J 31/5253; A47J 31/3609; A47J 31/525; A47J 31/42; A47J 31/52; A47J 31/404; A47J 31/36; A47J 31/5255; A47J 31/34; A47J 31/545; A47J 31/24; A47J 31/30; A47J 31/5251; A47J 31/468; A47J 31/56; A23F 5/26
  USPC ......... 99/300, 293, 295, 279, 280, 281, 282, 99/283, 284, 291, 453
  See application file for complete search history.

(56) References Cited

U.S. PATENT DOCUMENTS

| | | | |
|---|---|---|---|
| 2010/0186599 A1* | 7/2010 | Yoakim | A47J 31/407 99/302 C |
| 2013/0214744 A1* | 8/2013 | Kang | H02J 7/02 320/162 |
| 2015/0351581 A1* | 12/2015 | Li | A47J 31/5251 700/275 |

* cited by examiner

*Primary Examiner* — Phuong T Nguyen
(74) *Attorney, Agent, or Firm* — Che-Yang Chen; Law Office of Michael Chen

(57) ABSTRACT

A coffee machine for wirelessly driving a coffee filter cup to rotate relates to a coffee brewing device. The coffee machine comprises a machine body and a cup holder, wherein an annular frame is provided on the cup holder, an annular bracket for supporting a coffee filter cup is provided in the annular frame, and the annular bracket is rotatable relative to the annular frame; the machine body is provided with a charging coil, the cup holder is provided with a power receiving coil, and the power receiving coil is provided corresponding to the charging coil; a motor is provided on the cup holder, and the motor is capable of obtaining power through the power receiving coil to drive the annular bracket to rotate, thereby driving the coffee filter cup to rotate.

9 Claims, 2 Drawing Sheets

COFFEE MACHINE FOR WIRELESSLY DRIVING COFFEE FILTER CUP TO ROTATE

TECHNICAL FIELD

The present disclosure relates to a coffee brewing device, in particular to a coffee machine for wirelessly driving a coffee filter cup to rotate.

BACKGROUND

At present, the existing coffee appliances and water outlet methods in the market all use a direct-flow or spray-type water outlet for brewing coffee, which will seriously affect the brewing effect of coffee. Moreover, professional coffee is made by manual operation, which requires very high skills and is easily limited by the pursuit of consumers.

SUMMARY

The purpose of the present disclosure is to provide a coffee machine for wirelessly driving a coffee filter cup to rotate, which is convenient to use with an independent cup base structure and is capable of wirelessly driving a coffee filter cup to rotate, and has a non-electric contact structure which is not afraid of water washing.

The purpose of the present disclosure can be realized as follows. A coffee machine for wirelessly driving a coffee filter cup to rotate is designed, comprising a machine body and a cup holder, wherein an annular frame is provided on the cup holder, an annular bracket for supporting a coffee filter cup is provided in the annular frame, and the annular bracket is rotatable relative to the annular frame; the machine body is provided with a charging coil, the cup holder is provided with a power receiving coil, and the power receiving coil is provided corresponding to the charging coil; a motor is provided on the cup holder, and the motor is capable of obtaining power through the power receiving coil to drive the annular bracket to rotate, thereby driving the coffee filter cup to rotate.

Further, the cup holder comprises a base, the base is rectangular or circular and is located at the bottom, an aligning magnet is provided on the side close to the machine body, a magnet is provided at the bottom of the machine body corresponding to the aligning magnet on the base, the annular frame is connected with the base through an upright post, a frame structure is formed in which an annular frame is located at the upper part and a base is located at the bottom, the coffee filter cup is located on an annular bracket, and the base below the coffee filter cup in the frame is a position where the coffee cup is placed.

Further, the annular frame comprises an annular wall, a bottom plate and a top plate, the annular bracket is a through-hole ring, the annular bracket is located in the enclosure surrounded by three sides of the bottom plate, the top plate and the annular wall, the bottom plate and the top plate are middle hole annular plates, and the middle hole diameter of the top plate is larger than that of the annular bracket;

the annular bracket is a middle hole annular ring, teeth are provided on the circumference of the annular ring, and a gear sleeved on the output shaft of the motor 504 meshes with the teeth.

Further, the upper and lower end faces of the annular bracket are provided with first convex rings for reducing friction force, and the first convex rings are in contact with the bottom plate.

Further, the bottom plate is provided with a second convex ring for reducing friction force, and the annular wall is provided with a third convex ring for reducing friction force.

Further, the annular frame is provided with a limiting wheel and a limiting post, the limiting post is provided around the outer circumference of the annular bracket, and the limiting wheel is provided on the inner arc at the bottom of the annular bracket.

Further, a water tank is provided above the machine body, a heater and a water pump are provided at the bottom, a heating element and a temperature sensor are provided in the heater, a heater water outlet of the heater is connected with a water pump inlet of a water pump through a first water pipe, the heater water inlet of the heater is connected with the water inlet device, and a water outlet switch at the bottom of the water tank is connected with the water inlet device at the bottom of the machine body.

Further, a fixing base is provided on the side wall of the upper part of the machine body, a sprinkler head is provided on the fixing base, a water spray nozzle is provided at the bottom of the sprinkler head, the fixing base is of hollow structure, one end of the fixing base is fixedly connected with the side wall of the upper part of the machine body, the sprinkler head has a structure with one end open and the other end closed, and the open end of the sprinkler head rotatably connects the sprinkler head with the free end of the fixing base through a fixing ring.

Further, a water outlet of the water pump is connected with one end of a second water pipe, and the other end of the second water pipe is hermetically connected with the water inlet of the sprinkler head through the fixing base.

Further, a control panel is provided on the upper surface of the machine body, and a display screen, a knob and a function key are provided on the control panel.

According to the present disclosure, the charging coil fixed in the machine body and the power receiving coil fixed on the cup holder realize wireless connection between the machine body and the cup holder. Power is supplied to the cup holder through the machine body, so that the motor on the cup holder is controlled to drive the annular bracket to rotate. Water is sprayed on the coffee powder on the coffee filter cup at a proper position through the sprinkler head above the coffee filter cup, thereby realizing the effect of artificial coffee brewing and realizing the taste required by consumers for coffee brewing. Therefore, the present disclosure has the advantages of convenient operation, professionalism, low production and manufacturing cost, good effect, strong reliability and the like. The structure of independent placement of a rotating filter cup and a cup holder with artificial coffee brewing effect is convenient for miniaturization of packaging and has obvious cost advantage.

DETAILED DESCRIPTION

The present disclosure will be further described with reference to the following embodiments.

Figure 1:
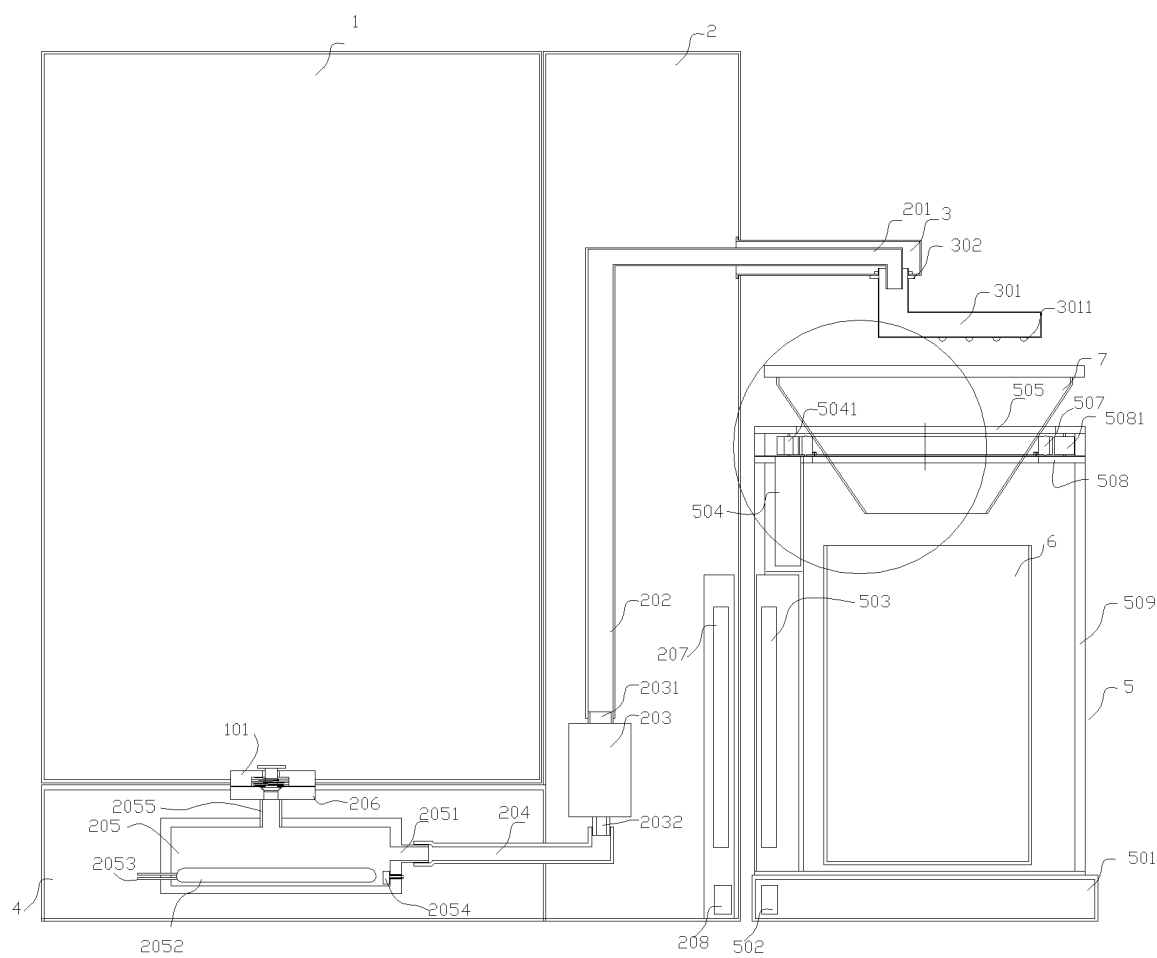
FIG. 1 is a schematic diagram of an embodiment of the present disclosure.
Figure 2:
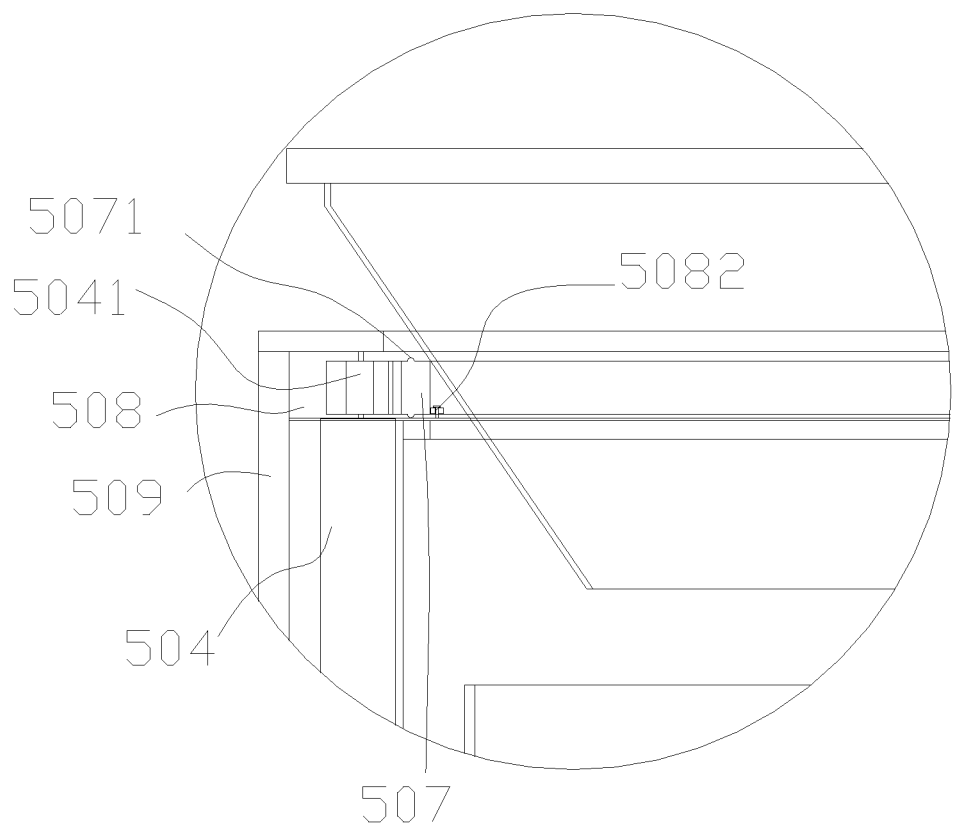
FIG. 2 is a partial enlarged view of an embodiment of the present disclosure.
Figure 3:
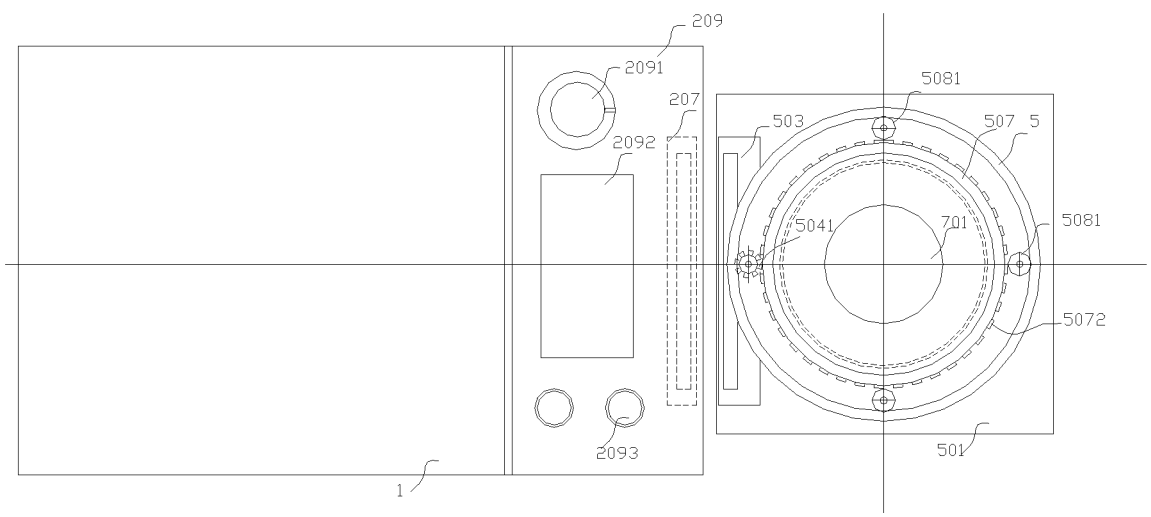
FIG. 3 is a top view of an embodiment of the present disclosure.

As shown in FIG. 1, FIG. 2 and FIG. 3, a coffee machine for wirelessly driving a coffee filter cup to rotate comprises a machine body 2 and a cup holder 5, wherein an annular frame 508 is provided on the cup holder 5, an annular bracket 507 for supporting a coffee filter cup 7 is provided in the annular frame 508, the machine body 2 is provided with a charging coil 207, the cup holder 5 is provided with a power receiving coil 503, the power receiving coil 503 is provided corresponding to the position of the charging coil 207, a motor 504 is provided on the cup holder 5, and the motor 504 drives the annular bracket 507 to rotate through the power receiving coil 503, thereby driving the coffee filter cup 7 to rotate.

The cup holder 5 comprises a base 501 and an annular frame 508, the base 501 is rectangular or circular and is located at the bottom. An aligning magnet 502 is provided on the side close to the machine body 2. A magnet 208 is provided at the bottom of the machine body 2 corresponding to the base 501 which is corresponding to the aligning magnet 502. The magnet 208 and the aligning magnet 502 are used to adhere the cup holder 5 to the machine body 2 for fixing. The annular frame 508 is connected with the base 501 through an upright post 509. A frame structure is formed in which an annular frame 508 is located at the upper part and a base 501 is located at the bottom. In use, the coffee filter cup 7 is placed on an annular bracket 507, and the coffee cup 6 is placed on the base 501 below the coffee filter cup 7 in the frame. The coffee liquid in the coffee filter cup 7 is naturally filtered out into the coffee cup 6 by gravity.

The annular frame 508 comprises an annular wall 5084, a bottom plate 5802 and a top plate 5083. The annular bracket 507 is a through-hole ring. The annular bracket 507 is located in the enclosure surrounded by three sides of the bottom plate 5802, the top plate 5083 and the annular wall 5804. The bottom plate 5802 and the top plate 5083 are middle hole annular plates. The middle hole diameter of the top plate 5083 is larger than that of the annular bracket 507, so that the coffee filter cup 7 will not be erected the top plate 5083.

The annular bracket 507 is a middle hole annular ring, teeth 5072 are provided on the circumference of the annular ring, and a gear 5041 sleeved on the output shaft of the motor 504 meshes with the teeth 5072. The upper and lower end faces of the annular bracket 507 are provided with convex rings 5071 for reducing friction force, and the convex rings 5071 are in contact with the bottom plate 5082. Alternatively, the bottom plate 5802 is provided with a second convex ring for reducing friction force, and the annular wall 5804 is provided with a third convex ring for reducing friction force. The above designs are all used to reduce the friction between the annular bracket 507 and the annular frame 508.

The annular frame 508 is provided with a limiting wheel 5082 and a limiting post 5081. The limiting post 5081 is provided around the outer circumference of the annular bracket 507. The limiting wheel 5082 is provided on the inner arc at the bottom of the annular bracket 507 to limit the annular bracket 507 from moving between the limiting post 5081 and the limiting wheel 5082, so as to keep the annular bracket 507 from moving too much and deviating from the range of the water spray nozzle 3011 on the sprinkler head 301.

A water tank 1 is provided above the machine body 2. A heater 205 and a water pump 203 are provided at the bottom. A heating element 2052 and a temperature sensor 2054 are provided in the heater 205. A heater water outlet 2051 of the heater 205 is connected with a water pump inlet 2032 of a water pump 203 through a first water pipe 204. The heater water inlet 2055 of the heater 205 is connected with the water inlet device 206. A water outlet switch 101 at the bottom of the water tank is connected with the water inlet device 206 at the bottom of the machine body 2.

A fixing base 3 is provided on the side wall of the upper part of the machine body 2. A sprinkler head 301 is provided on the fixing base 3. A water spray nozzle 3011 is provided at the bottom of the sprinkler head 301. The fixing base 3 is of hollow structure. One end of the fixing base 3 is fixedly connected with the side wall of the upper part of the machine body 2. The sprinkler head 301 has a structure with one end open and the other end closed. The open end of the sprinkler head 301 rotatably connects the sprinkler head 301 with the free end of the fixing base 3 through a fixing ring 302. The water spray nozzle 3011 is provided above the annular bracket 507, and the water from the water spray nozzle 3011 is sprayed into the coffee filter cup 7.

A water outlet 2031 of the water pump 203 is connected with one end of a second water pipe 202, and the other end of the second water pipe 202 is hermetically connected with the water inlet of the sprinkler head 301 through the fixing base 3.

A control panel 209 is provided on the upper surface of the machine body 2, and a display screen 2092, a knob 2091 and a function key 2093 are provided on the control panel 209. The user selects the corresponding function through the knob 2091 and the function key 2093 of the control panel 209, and displays the selected function and other information on the display screen 2092.

The following is the use process of the present disclosure:

The coffee machine for wirelessly driving a coffee filter cup to rotate is powered, a proper amount of water is added into the water tank 1, the coffee cup 6 is placed into the frame 5, then the coffee filter cup 7 is placed on the annular bracket 507, a proper amount of coffee powder is added in the coffee filter cup 7, the "simulated artificial brewing" function key 2093 on the control panel 209 is selected, and the sprinkler head 301 is manually adjusted to a position where the coffee powder on the inclined wall of the coffee filter cup 7 can be covered. "ON" button on the control panel 209 is activated. At this time, the control circuit in the machine body 2 controls the charging coil 207 under the machine body 2 to power on, and the power receiving coil 503 on the cup holder 5 corresponding to the charging coil 207 obtains induced voltage. The driving circuit drives the motor 504 to rotate through the induced voltage. The rotation of the motor 504 drives the driving gear 5041 on the output shaft of the motor 504 to rotate. The rotation of the gear 5041 drives the teeth on the circumference of the annular bracket 507 to rotate the annular bracket 507. At this time, the coffee filter cup 7 placed on the annular bracket 507 also rotates with the annular bracket 507. At this time, the water in the water tank 1 enters the heater 205, and the control circuit controls the heating element 2052 to heat. Until the temperature sensor 2054 in the heater 205 detects that the water temperature reaches above 98 degrees, the control circuit controls the water pump 203 to start working, pumping boiled water to the outlet pipe 2051 into the first water pipe 204, passing through the fixing base 3, pumping boiled water onto the sprinkler head 301, and spraying boiled water from the water spray nozzle 3011 below the sprinkler head 301 onto the coffee power on the coffee filter cup 7. At the same time, the coffee filter cup 7 keeps rotating under the rotation of the annular bracket 507. Although the water spray nozzle 3011 does not rotate due to the rotation of the coffee filter cup 7, the boiled water sprayed by the water spray nozzle 301 can be uniformly sprayed on the coffee powder on the coffee filter cup 7 due to the rotation of the coffee filter cup 7. In this way, the effect of "simulating artificial brewing" of coffee is realized, and the brewed coffee has better taste.

According to the present disclosure, the phenomenon can be avoided that the solidification of coffee powder production caused by manual operation affects the brewing effect and the demand of consumers cannot be met. The present disclosure has the advantages of convenient and professional operation, safe use, low cost, strong reliability and the like.

What is claimed is:

1. A coffee machine for wirelessly driving a coffee filter cup to rotate, comprising a machine body and a cup holder, wherein an annular frame is provided on the cup holder, an annular bracket for supporting the coffee filter cup in a coaxial manner is provided in the annular frame, and the annular bracket is rotatable relative to the annular frame; the machine body is provided with a charging coil, the cup holder is provided with a power receiving coil, and the power receiving coil is provided corresponding to the charging coil; a motor is provided on the cup holder, and the motor is capable of obtaining power through the power receiving coil to drive the annular bracket to rotate, thereby driving the coffee filter cup to rotate, wherein the coffee filter cup is driven to self-rotate by the annular bracket, so that boiled water is uniformly sprayed on coffee powder added into the coffee filter cup, wherein the cup holder comprises a base, the base is rectangular or circular and is located at the bottom, an aligning magnet is provided on the side close to the machine body, a magnet is provided at the bottom of the machine body corresponding to the aligning magnet on the base, the annular frame is connected with the base through an upright post, a frame structure is formed in which the annular frame is located at the upper part and the base is located at the bottom, the coffee filter cup is located on the annular bracket, and the base below the coffee filter cup in the frame is a position where the coffee cup is placed.

2. The coffee machine for wirelessly driving the coffee filter cup to rotate according to claim 1, wherein the annular frame comprises an annular wall, a bottom plate and a top plate, the annular bracket is a through-hole ring, the annular bracket is located in the enclosure surrounded by three sides of the bottom plate, the top plate and the annular wall, the bottom plate and the top plate are middle hole annular plates, and the middle hole diameter of the top plate is larger than that of the annular bracket; the annular bracket is a middle hole annular ring, teeth are provided on the circumference of the annular ring, and a gear sleeved on the output shaft of the motor meshes with the teeth.

3. The coffee machine for wirelessly driving the coffee filter cup to rotate according to claim 2, wherein the upper and lower end faces of the annular bracket are provided with first convex rings for reducing friction force, and the first convex rings are in contact with the bottom plate.

4. The coffee machine for wirelessly driving the coffee filter cup to rotate according to claim 2, wherein the bottom plate is provided with a second convex ring for reducing friction force, and the annular wall is provided with a third convex ring for reducing friction force.

5. The coffee machine for wirelessly driving the coffee filter cup to rotate according to claim 2, wherein the annular frame is provided with a limiting wheel and a limiting post, the limiting post is provided around the outer circumference of the annular bracket, and the limiting wheel is provided on the inner arc at the bottom of the annular bracket.

6. The coffee machine for wirelessly driving the coffee filter cup to rotate according to claim 2, wherein a water tank is provided above the machine body, a heater and a water pump are provided at the bottom, a heating element and a temperature sensor are provided in the heater, a heater water outlet of the heater is connected with a water pump inlet of a water pump through a first water pipe, the heater water inlet of the heater is connected with the water inlet device, and a water outlet switch at the bottom of the water tank is connected with the water inlet device at the bottom of the machine body.

7. The coffee machine for wirelessly driving the coffee filter cup to rotate according to claim 1, wherein a fixing base is provided on the side wall of the upper part of the machine body, a sprinkler head is provided on the fixing base, a water spray nozzle is provided at the bottom of the sprinkler head, the fixing base is of hollow structure, one end of the fixing base is fixedly connected with the side wall of the upper part of the machine body, the sprinkler head has a structure with one end open and the other end closed, and the open end of the sprinkler head rotatably connects the sprinkler head with the free end of the fixing base through a fixing ring.

8. The coffee machine for wirelessly driving the coffee filter cup to rotate according to claim 7, wherein a water outlet of a water pump is connected with one end of a second water pipe, and the other end of the second water pipe is hermetically connected with a water inlet of the sprinkler head through the fixing base.

9. The coffee machine for wirelessly driving the coffee filter cup to rotate according to claim 1, wherein a control panel is provided on the upper surface of the machine body, and a display screen, a knob and a function key are provided on the control panel.

\* \* \* \* \*